C. ANDERSEN.
Filters.
No. 143,113. Patented September 23, 1873.
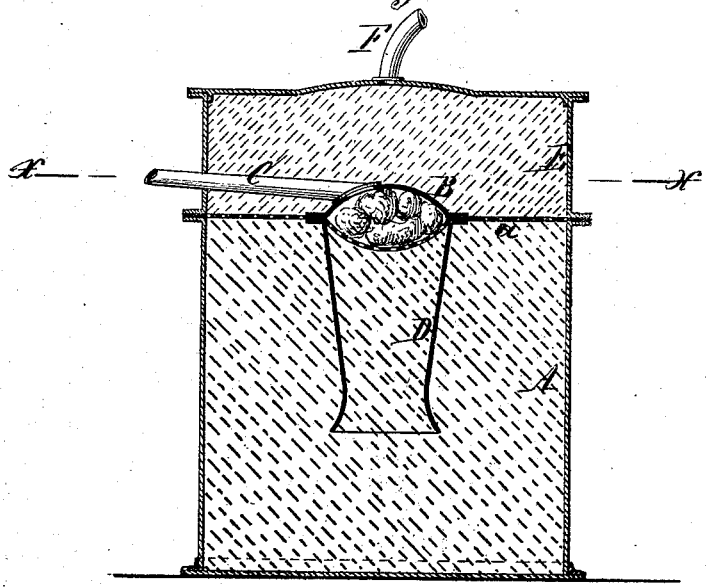
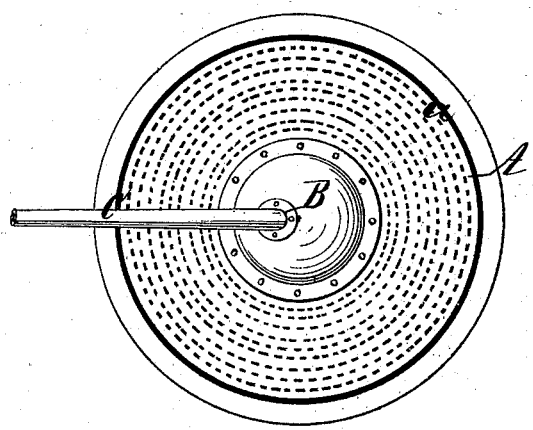

UNITED STATES PATENT OFFICE.

CHRISTIAN ANDERSEN, OF BROOKLYN, NEW YORK.

IMPROVEMENT IN FILTERS.

Specification forming part of Letters Patent No. 143,113, dated September 23, 1873; application filed August 7, 1873.

*To all whom it may concern:*

Be it known that I, CHRISTIAN ANDERSEN, of Brooklyn, in the county of Kings and State of New York, have invented a new and useful Improvement in Filters; and I do hereby declare the following to be a full, clear, and exact description thereof, which will enable those skilled in the art to make and use the same, reference being had to the accompanying drawing forming part of this specification, in which drawing—

Figure 1 represents a vertical central section of this invention. Fig. 2 is a horizontal section of the same in the plane $x$ $x$, Fig. 1.

Similar letters indicate corresponding parts.

This invention consists in the arrangement of a discharge-chamber with a perforated bottom and a pipe extending from its top, said discharge-chamber being secured in the perforated top of a vessel containing pulverized carbon or other filtering material in such a manner that when the liquid to be filtered is poured on the perforated top of the carbon-vessel it has to pass down through the carbon, and then up again in order to reach the discharge-chamber, and thereby every particle of the liquid is brought in intimate contact with the carbon. With the discharge-chamber is combined a downwardly-projecting tube, which is also packed with carbon or other filtering material, and which assists in insuring the contact of the liquid with the filtering material. The discharge-chamber is filled with sponge, which serves to retain such impurities not previously absorbed by the filtering material in the carbon-vessel. On the top of the carbon-vessel is placed a vessel filled with sand, which serves to distribute the liquid to be filtered uniformly over the perforated top of the carbon-vessel.

In the drawing, the letter A designates a vessel, which is made of sheet metal or any other suitable material, and which is provided with a perforated top, $a$. In this top is secured a spheroidal chamber, B, from the top of which extends the delivery-pipe C, while its bottom is perforated to admit the liquid from below. Said discharge-chamber is, by preference, made in two halves, so that it can be opened for the purpose of cleaning. From the bottom of the discharge-chamber extends a pipe, D, downward, and this pipe is, by preference, made conical and bell-mouthed.

The vessel A is filled with pulverized carbon or other suitable filtering material, and the pipe D is packed with the same or any other suitable filtering material, and the discharge-chamber is filled with sponge. The liquid to be filtered is poured on the perforated top of the vessel A, and it passes down through the filtering material in this vessel, and up through the filtering material in the pipe D, before it can reach the discharge-chamber B and the delivery-pipe C. By these means every particle of the liquid is brought in intimate contact with the filtering material, and the impurities mixed with said liquid are effectually retained.

By filling the discharge-chamber with sponge the liquid is subjected to a final cleansing process before it is permitted to escape from the filter.

On the top of the vessel A is secured a vessel, E, which is filled with sand, and the liquid, on being admitted to this vessel through the pipe F, is caused to spread by the sand, and it passes down uniformly through every part of the vessel A.

This filter is intended particularly for alcoholic liquids, but it can be used for any liquid that has to undergo a filtering operation.

What I claim as new, and desire to secure by Letters Patent, is—

1. The arrangement of a discharge-chamber, B, with a perforated bottom, in the perforated top of the filtering-vessel A, substantially as and for the purpose shown and described.

2. The pipe D, extending downward from the discharge-chamber B, in combination with this chamber and with the filtering-vessel A, substantially as set forth.

3. The sand-vessel E, in combination with the filtering-vessel A, perforated top A, and discharge-chamber B, all constructed and operating substantially as and for the purpose described.

This specification signed by me this 1st day of August, 1873.

C. ANDERSEN.

Witnesses:
W. HAUFF,
E. F. KASTENHUBER.